United States Patent
Juha

(10) Patent No.: US 10,881,236 B2
(45) Date of Patent: Jan. 5, 2021

(54) COOKING VESSEL AND MANUFACTURING METHOD

(71) Applicant: Fiskars Finland Oy Ab, Helsinki (FI)

(72) Inventor: Pimiä Juha, Helsinki (FI)

(73) Assignee: Fiskars Finland Oy Ab, Helsinki (FI)

( * ) Notice: Subject to any disclaimer, the term of this patent is extended or adjusted under 35 U.S.C. 154(b) by 0 days.

(21) Appl. No.: 15/294,003

(22) Filed: Oct. 14, 2016

(65) Prior Publication Data
US 2017/0119190 A1 May 4, 2017

(30) Foreign Application Priority Data
Oct. 30, 2015 (FI) .................................. 20155775

(51) Int. Cl.
| A47J 27/00 | (2006.01) |
| A47J 36/02 | (2006.01) |
| B23K 20/00 | (2006.01) |
| H05B 6/12  | (2006.01) |
| A47J 27/022 | (2006.01) |

(52) U.S. Cl.
CPC .......... *A47J 27/002* (2013.01); *A47J 27/022* (2013.01); *A47J 36/02* (2013.01); *A47J 36/025* (2013.01); *B23K 20/00* (2013.01); *H05B 6/1209* (2013.01)

(58) Field of Classification Search
None
See application file for complete search history.

(56) References Cited

U.S. PATENT DOCUMENTS

| 2,917,818 A * | 12/1959 | Thomson | C23C 2/12 |
| | | | 428/651 |
| 3,650,710 A | 3/1972 | Doucerain | |
| 3,684,853 A * | 8/1972 | Welch | A47J 36/02 |
| | | | 219/624 |
| 3,742,174 A * | 6/1973 | Harnden, Jr. | A47J 27/002 |
| | | | 219/445.1 |
| 3,742,178 A * | 6/1973 | Harnden, Jr. | A47J 27/002 |
| | | | 219/385 |
| 3,745,290 A * | 7/1973 | Harnden, Jr. | A47J 27/002 |
| | | | 219/386 |

(Continued)

FOREIGN PATENT DOCUMENTS

| CN | 2305125 | 1/1999 |
| CN | 2770525 Y | 4/2006 |

(Continued)

OTHER PUBLICATIONS

English-language machine translation of DE 4 405 101-A1, Emmel, Thomas (Jul. 7, 1994).

(Continued)

*Primary Examiner* — Ibrahime A Abraham
*Assistant Examiner* — Gyounghyun Bae
(74) *Attorney, Agent, or Firm* — Foley & Lardner LLP

(57) ABSTRACT

A cooking vessel includes a receptacle of a first material for receiving foodstuff, and a bottom section of a second material. The bottom section being attached to the receptacle for providing an induction heating capability for the cooking vessel. In order to provide a cooking vessel whose temperature can simply and reliably be determined during induction heating the second material is unalloyed or low-alloyed steel.

7 Claims, 2 Drawing Sheets

(56) References Cited

U.S. PATENT DOCUMENTS

| | | | | |
|---|---|---|---|---|
| 3,773,500 A | * | 11/1973 | Kanazawa | C22C 38/04 420/87 |
| 3,777,094 A | * | 12/1973 | Peters, Jr. | A47J 36/04 219/621 |
| 3,897,280 A | * | 7/1975 | Gondo | C21D 8/0426 148/505 |
| 3,966,426 A | * | 6/1976 | McCoy | A47J 36/02 428/653 |
| 3,983,275 A | * | 9/1976 | Winter | A47J 36/02 428/34.7 |
| 4,354,082 A | * | 10/1982 | Tellert | H05B 6/12 219/621 |
| 4,552,284 A | * | 11/1985 | Rummelsburg | A47J 36/02 220/573.1 |
| 4,564,001 A | * | 1/1986 | Maeda | A47J 27/002 126/390.1 |
| 4,574,777 A | * | 3/1986 | Bohl | A47J 37/10 126/390.1 |
| 4,614,852 A | * | 9/1986 | Matsushita | A47J 36/02 219/621 |
| 4,686,152 A | * | 8/1987 | Matsubayashi | B32B 15/08 428/607 |
| 5,064,055 A | * | 11/1991 | Bessenbach | A47J 36/02 126/390.1 |
| 5,139,889 A | * | 8/1992 | Imazu | B21D 22/201 220/62.11 |
| 5,770,837 A | * | 6/1998 | Hatta | A47J 36/02 219/621 |
| 6,099,924 A | * | 8/2000 | Nakamaki | B32B 27/36 428/220 |
| 6,267,830 B1 | * | 7/2001 | Groll | A47J 27/002 148/531 |
| 6,427,904 B1 | * | 8/2002 | Groll | B23K 20/04 228/194 |
| 6,764,730 B2 | * | 7/2004 | Sato | B32B 15/08 428/35.8 |
| 6,793,093 B2 | * | 9/2004 | Tsai | A47J 27/002 220/573.1 |
| 6,906,295 B2 | * | 6/2005 | Ge | C23C 14/0641 219/621 |
| 6,942,935 B2 | * | 9/2005 | Ge | A47J 36/04 428/212 |
| 7,026,036 B2 | * | 4/2006 | Leech | C08L 27/18 428/142 |
| 7,097,064 B2 | * | 8/2006 | Cheng | A47J 27/002 220/573.1 |
| 7,416,619 B2 | * | 8/2008 | Lei | A47J 36/02 148/542 |
| 7,906,221 B2 | * | 3/2011 | Groll | A47J 36/02 220/573.1 |
| 7,906,748 B2 | * | 3/2011 | Imura | A47J 36/027 219/622 |
| 7,919,729 B2 | * | 4/2011 | Hsu | A47J 36/02 219/432 |
| 7,960,034 B2 | * | 6/2011 | Groll | B32B 15/012 220/573.1 |
| 8,602,248 B2 | * | 12/2013 | Mathieu | A47J 27/002 219/620 |
| 8,796,598 B2 | * | 8/2014 | England | A47J 27/002 219/621 |
| 8,851,319 B2 | * | 10/2014 | Berrux | A47J 36/02 219/621 |
| 8,993,118 B2 | * | 3/2015 | Hirano | C23C 22/361 428/213 |
| 9,758,681 B2 | * | 9/2017 | Le Bris | C09D 127/18 |
| 10,292,528 B2 | * | 5/2019 | Perillon | A47J 36/025 |
| 2004/0229079 A1 | * | 11/2004 | Groll | A47J 36/02 428/653 |
| 2012/0273483 A1 | | 11/2012 | Pimae | |
| 2015/0083711 A1 | | 3/2015 | Moon et al. | |

FOREIGN PATENT DOCUMENTS

| | | | |
|---|---|---|---|
| CN | 101263972 A | | 9/2008 |
| CN | 201223273 | * | 4/2009 |
| CN | 101911727 A | | 12/2010 |
| CN | 201798510 | | 4/2011 |
| CN | 203555609 | | 4/2014 |
| CN | 204181435 | | 3/2015 |
| CN | 104603612 A | | 5/2015 |
| DE | 4 405 101 A1 | | 7/1994 |
| EP | 2113181 A1 | | 11/2009 |
| GB | 1 329 522 A | | 9/1973 |
| JP | 08-056844 A | | 3/1996 |
| JP | 09-199264 A | | 7/1997 |
| JP | 2004-009097 A | | 1/2004 |
| WO | WO-2004/019742 A1 | | 3/2004 |

OTHER PUBLICATIONS

Finnish Search Report, App. No. 20155775, Fiskars Finland Oy Ab, 1 page (dated Apr. 27, 2016).

Extended European Search Report, EP 16196141.2, Fiskars Finland Oy Ab, 6 pages (dated Mar. 1, 2017).

Office Action for EP Application No. 16196141.2, dated Apr. 9, 2019, 6 pages.

English Translation of Notification of the Reasons for Rejection for KR Application No. 10-2016-0142904, dated Jun. 14, 2019, 5 pages.

English Translation of Office Action Received for Chinese Application No. 201610959335.5, dated Oct. 28, 2019, 8 pages.

Office Action and its English Translation for Chinese Application No. 201610959335.5, dated Jul. 3, 2020, 13 pages.

* cited by examiner

COOKING VESSEL AND MANUFACTURING METHOD

CROSS-REFERENCE TO RELATED APPLICATIONS

This Application claims the benefit of and priority to Finnish Application No. 20155775, filed on Oct. 30, 2015, all of which is incorporated by reference herein in its entirety.

BACKGROUND OF THE INVENTION

Field of the Invention

This invention relates to cooking vessel such as to a kettle, frying-pan or pot which is used for preparing foodstuff on an induction heater.

Description of Prior Art

Induction heaters heat cooking vessels by magnetic induction which is obtained with an alternating electric current fed through a coil. The resulting field induces eddy currents in the cooking vessel, in particular in the bottom of the cooking vessel, which contribute in heating the cooking vessel. In order to provide an induction heating capability for a cooking vessel the materials used in the cooking vessel need consideration. In praxis many prior art cooking vessels are made of ferritic stainless steel or at least contain ferritic stainless steel in a bottom section while the remaining part of the cooking vessel is manufactured of another material.

Previously it is known to provide under a cooking support of an induction heater a measuring instrument with an measuring coil. This measuring instrument produces an induction measuring resonant circuitry which interacts with the cooking vessel. The measuring resonant circuitry has a resonant frequency which is dependent on the permeability or inductivity of the cooking vessel. This permeability of the cooking vessel is in turn dependent on the temperature of the cooking vessel that is heated. The relationship between the resonant frequency and the temperature of the cooking vessel can be utilized to determine the temperature of the cooking vessel based on the frequency. In practical implementations the used induction heater and/or the user can be provided with information about the current temperature based on the measured frequency.

A problem with temperature measurements carried out in this way is the accuracy. Practical tests with prior art cooking vessels have shown that in prior art solutions there is a hysteresis between heating and cooling a cooking vessel. At a particular frequency the actual temperature may vary with as much as 70° C. depending on if the cooking vessel is being heated from 20° C. to 250° C. or if it is cooling down from 250° C. to 20° C. Due to this hysteresis it is not possible to determine the correct temperature of a cooking vessel at each moment based on the frequency, at least not with an accuracy which would be preferable while heating foodstuff.

SUMMARY OF THE INVENTION

An object of the present invention is to solve the above mentioned drawback and to provide a cooking vessel with an induction heating capability and whose temperature can be simply and reliably determined during induction heating. This object is achieved with a cooking vessel according to independent claim 1.

The use of a bottom section manufactured of unalloyed or low-alloyed steel gives excellent properties for a cooking vessel, as it becomes possible to accurately determine the temperature of the cooking vessel based on the frequency both while the temperature of the cooking vessel increases and while it decreases.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
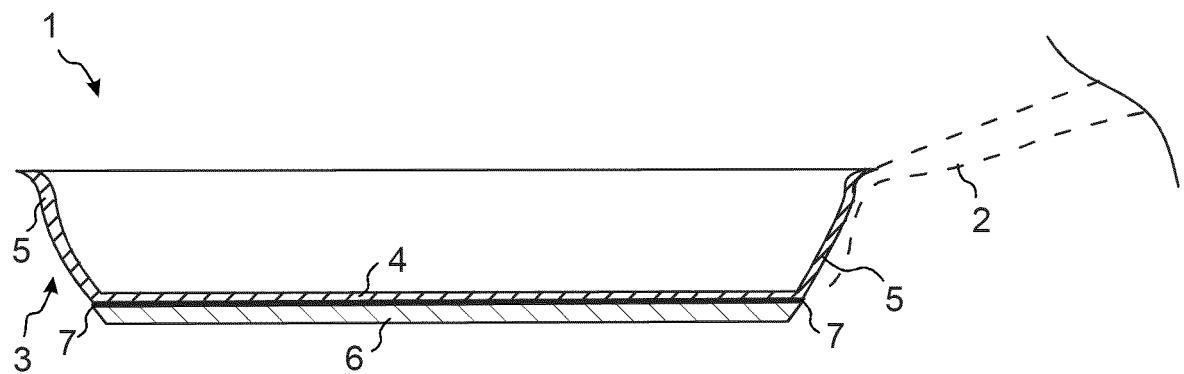
FIG. 1 illustrates a first embodiment of a cooking vessel.

FIG. 1 illustrates a first embodiment of a cooking vessel 1. FIG. 1 illustrates the cooking vessel in cross-section in order to show the various parts and layers included in the cooking vessel. The handle 2 of the cooking vessel is only partially illustrated by dotted lines.

In FIG. 1 it is by way of example assumed that the cooking vessel 1 is a frying pan. However, this is only an example of one possible cooking vessel, and in praxis the cooking vessel may instead be a kettle, a pot or any other cooking vessel suitable for preparing foodstuff on an induction heater. In this connection the term foodstuff refers generally to any material which needs to be heated while preparing food.

The illustrated cooking vessel 1 comprises a receptacle 3 of a first material. During use this receptacle 3 receives foodstuff. For this purpose the receptacle has a tight bottom 4 and edges 5 protruding upwards from the bottom 4 in order to ensure that the foodstuff does not leak out of the receptacle 1 during use. Additionally, though not illustrated, the receptacle may be provided with a lid, for instance. The first material used for manufacturing the receptacle 3 may be any material commonly used in cooking vessels. Consequently the first material may be aluminum or stainless steel, for instance. The material thickness of the bottom 4 and edges 5 may be about 3-6 mm, for instance. If necessary, a coating layer of a non-stick material may be provided to cover the inner surface of the receptacle 3 in order to prevent foodstuff from being stuck on the inner surface.

The cooking vessel 1 additionally comprises a bottom section 6 of a second material. The thickness of the bottom section may be more than 0.1 mm, preferably about 0.5 mm, though it is possible to utilize bottom sections which are even thicker. The bottom section 6 provides an induction heating capability for the cooking vessel 1. Therefore, the receptacle 3 may be of aluminum for instance, as the bottom section 6 ensures that the cooking vessel 1 indeed can be heated with an induction heater even though aluminum is not suitable for heating with an induction heater. The second material used in the bottom section 6 is unalloyed or low-alloyed steel. Practical tests have shown that once unalloyed or low-alloyed steel is used in the bottom section 6, it becomes possible to accurately determine the temperature of the cooking vessel 1 on an induction heater based on the frequency both while the temperature of the cooking vessel 1 increases and while it decreases. According to practical tests the temperature of the cooking vessel can in this way be measured with an error of less than 5° C. Therefore, no similar hysteresis between heating and cooling is present as in prior art cooking vessels where the bottom section comprises ferritic stainless steel, for instance. Therefore it is possible to determine the temperature very accurately with a measuring resonant circuitry based on the measured frequency.

In this connection the terms unalloyed steel and low-alloyed steel refer to a steel which contains carbon, but the steel has not been processed or provided with additives that prevent corrosion when exposed to air and moisture. One alternative is that this steel contains carbon in the range of 0.1-5% and where the total share of the alloying components, such as Si, Mn, Al, Ti and Cu, does not exceed 8%. Another alternative is that the steel is an unalloyed steel commonly referred to as an electrical steel, in other words a steel which contains less than 0.005% carbon but which contains silicon.

In the illustrated example, the bottom section 6 is attached to the receptacle 3 by a coating layer 7. On alternative is to utilize a coating layer 7 of chromium, nickel, aluminum or copper. This makes it possible to attach the receptacle 3 to the bottom section 6 by means of the coating layer 7 alone. Consequently no additional mechanical or other attachment means are needed for this attachment. One alternative is to carry out the attachment by impact bonding. In impact bonding the bottom section 6 and the receptacle 3 are arranged on top of each other with the coating layer 7 between them. In this position a high pressure is utilized to press the parts together, such that friction between the parts leads to a situation where the parts are bonded together.

The thickness of the coating layer 7 may vary depending on the implementation. In case a receptacle 3 of aluminum is used, this receptacle may be attached to a bottom section 6 of unalloyed or low-alloyed steel by impact bonding when a coating layer 7 of chromium, nickel, aluminum or copper is arranged between the receptacle 3 and bottom part 6. In that case the amount of chromium, nickel, aluminum or copper may be about 50-180 mg/m$^2$, which in practical implementation will result in a coating layer 7 which may be very thin, in praxis about 0.2 nm-30 μm. However, coating layers of other thicknesses may be used in other implementations.

Figure 2:
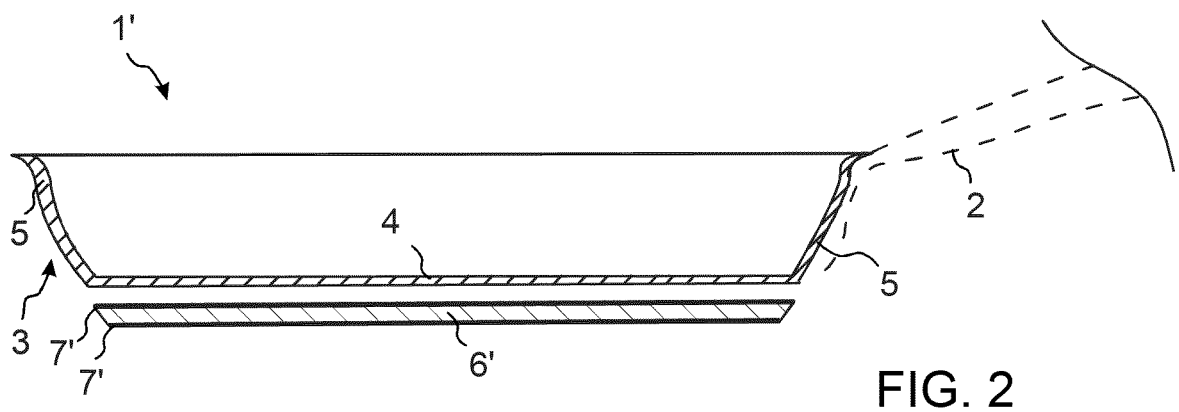
FIG. 2 illustrates a second embodiment of a cooking vessel.

FIG. 2 illustrates a second embodiment of a cooking vessel. The embodiment of FIG. 2 is very similar as the embodiment of FIG. 1. Therefore in the following the embodiment of FIG. 2 will be explained mainly by pointing out the differences between these embodiments.

In FIG. 2 the receptacle 3 is implemented as explained in connection with FIG. 1. However, the bottom section 6' is manufactured of an ECCS (Electrically Chromium Coated Steel) plate. Such ECCS plates of unalloyed steel or low-alloyed steel where the upper and lower surfaces are coated by a coating layer 7' are commercially available.

An advantage of utilizing an ECCS plate for manufacturing the bottom section 6' is that the manufacturing process becomes very simple. It is sufficient to cut a bottom section 6' of a suitable size and to attach this bottom section 6' to the receptacle 3 by impact bonding.

Figure 3:
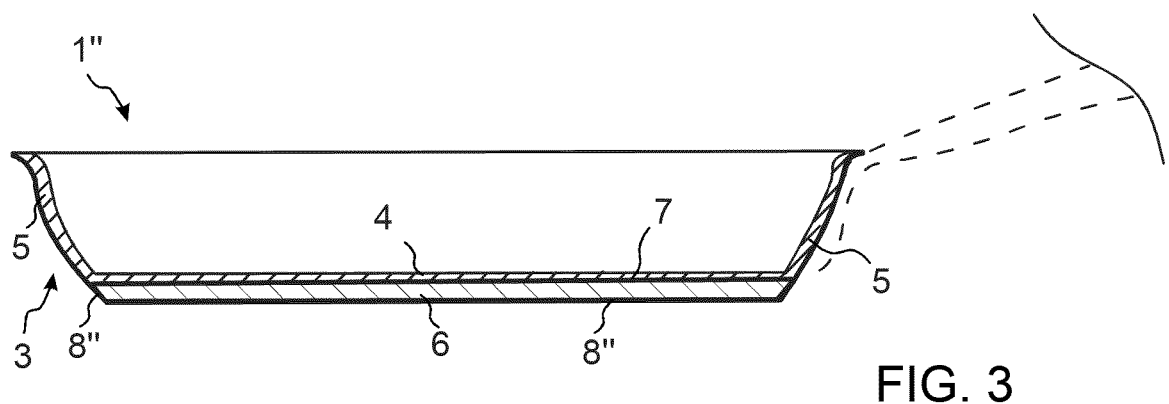
FIG. 3 illustrates a third embodiment of a cooking vessel.

FIG. 3 illustrates a third embodiment of a cooking vessel. The embodiment of FIG. 3 is very similar as the embodiment of FIG. 1. Therefore in the following the embodiment of FIG. 3 will be explained mainly by pointing out the differences between these embodiments.

In FIG. 3 the receptacle 3 and the bottom section 6 are implemented and attached to each other with the coating layer 7 as explained in connection with FIG. 1. Alternatively it is possible to utilize a bottom section 6' as explained in connection with FIG. 2.

In FIG. 3 an additional corrosion protection layer 8" is included in the cooking vessel. In the illustrated example the corrosion protection layer is added as a continuous layer extending along the entire outer surface of the receptacle 3 and also along the entire outer surface of the bottom section 6. The corrosion protection layer 8" may be implemented as a layer of silicone polyester or as a ceramic sol-gel coating, for instance. Silicone polyester is a polyester coating which includes silicone. A ceramic sol-gel coating is a siloxane based non-organic compound, in praxis a silicone glass.

The illustrated cooking vessel may be manufactured by initially providing a receptacle 4 of a first material for receiving foodstuff, as illustrated in FIG. 2, for instance. The first material may be stainless steel or aluminum, for instance. A bottom section 6 or 6' (as illustrated in FIG. 1 or 2) of a second material dimensioned to fit to the bottom of the receptacle is taken into use. The second material is an unalloyed or low-alloyed steel. The bottom section and the receptacle are arranged on top of each other with a coating layer between them.

A "coating layer" refers to a material layer which is applied by a suitable coating process, such as spraying or electrolytic coating, on top of a surface of an object, such as on the bottom of the receptacle or on a surface of the bottom section. Consequently, the raw material is a compound consisting practically of chromium, nickel, aluminum or copper alone. In praxis the amount of chromium, nickel, aluminum or copper in the coating layer in most cases exceeds 50%.

Once the bottom section and the receptacle are arranged on top of each other with a coating layer between them, the bottom section and the receptacle are attached to each other. This may be implemented by impact bonding, such that the coating layer attaches the receptacle to the bottom section without any additional attachment means.

Figure 4:
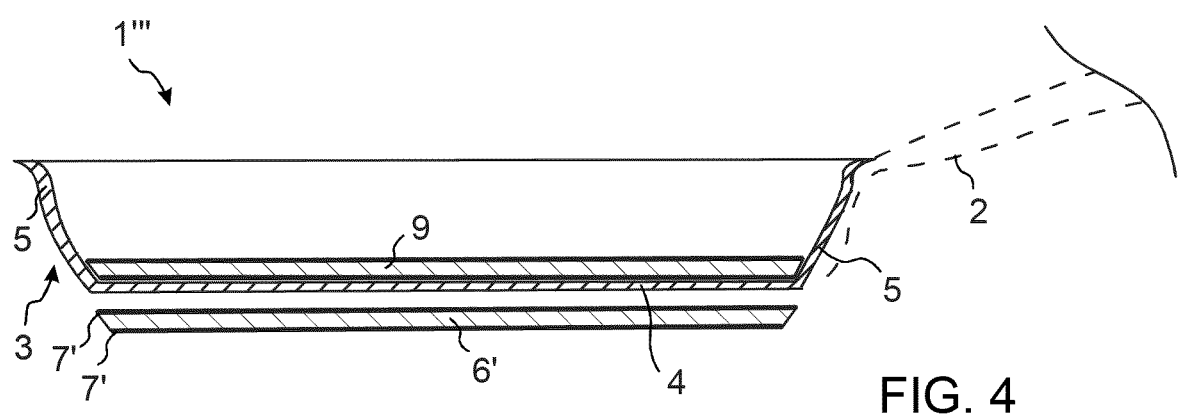
FIG. 4 illustrates a fourth embodiment of a cooking vessel.

FIG. 4 illustrates a fourth embodiment of a cooking vessel 1'''. The embodiment of FIG. 4 is very similar as the embodiment of FIG. 2. Therefore in the following the embodiment of FIG. 4 will be explained mainly by pointing out the differences between these embodiments.

In FIG. 4 the cooking vessel 1''' comprises a receptacle 3 of aluminum in combination with two layers of an ECCS plate, in other words a plate of unalloyed steel or low-alloyed steel where the upper and lower surfaces are coated by a coating layer.

On the inner side of the receptacle a first ECCS plate 9 is arranged to cover the inner bottom surface of the receptacle 4. This plate may have upper and lower coating layers of chromium. In that case it is not necessary to provide any additional coating layers within the receptacle, but instead the foodstuff may be allowed to directly contact the upper surface of the ECCS plate 9. Naturally, if desired, an additional coating layer may be arranged to cover the upper surface of the ECCS plate 9.

The outer bottom surface of the receptacle 4 is covered by second ECCS plate which provides the bottom section 6' and the coating layers 7', as has previously been explained in connection with FIG. 2. Also in this case the bottom section 6' may be of unalloyed steel or low-alloyed steel with the upper and lower surfaces are coated by a coating layer 7' of chromium.

Similarly as has been explained in connection with the previous embodiments, the cooking vessel 1''' may be manufactured by arranging the ECCS plates and the receptacle in the positions illustrated in FIG. 4, after which the attachment is carried out by impact bonding without utilizing other attachment means.

It is to be understood that the above description and the accompanying figures are only intended to illustrate the present invention. It will be obvious to a person skilled in the art that the invention can be varied and modified without departing from the scope of the invention.

The invention claimed is:

1. A cooking vessel comprising:
a receptacle of a first material comprising at least one of aluminum and stainless Steel for receiving foodstuff, and
a bottom section of a second material which is a solid unalloyed or low-alloyed steel containing carbon in a range of 0.1-5%, or containing carbon in a range of less than 0.005% and containing silicon, wherein the total share of alloying components which optionally include one or more of silicone, manganese, aluminum, and copper does not exceed 8 percent, the bottom section being attached to the receptacle for providing an induction heating capability for the cooking vessel, wherein
the second material is coated with a coating layer of chromium, and
the receptacle and the bottom section are attached to each other by the coating layer.

2. The cooking vessel according to claim 1, wherein the coating layer is of the chromium and the amount of the chromium is within a range between 50-180 mg/m$^2$ inclusive.

3. The cooking vessel according to claim 1, wherein the coating is a thin layer of chromium having a thickness within a range between 0.2 nm-30 µm inclusive.

4. The cooking vessel according to claim 1, wherein the first material is aluminum.

5. The cooking vessel according to claim 1, where the first material is stainless steel.

6. The cooking vessel according to claim 1, wherein the bottom section has a thickness of more than 0.1 mm, and less than or equal to 0.5 mm.

7. The cooking vessel according to claim 1 wherein outer surfaces of the bottom section are protected by a corrosion protection layer.

* * * * *